United States Patent [19]

Onizawa

[11] 4,128,539

[45] Dec. 5, 1978

[54] CURABLE VINYL CHLORIDE RESIN COMPOSITION

[75] Inventor: Masao Onizawa, Ohmiya, Japan

[73] Assignee: Sanyo Trading Co., Ltd., Tokyo, Japan

[21] Appl. No.: 864,444

[22] Filed: Dec. 27, 1977

[30] Foreign Application Priority Data

Dec. 25, 1976 [JP] Japan .............................. 51/155654
Mar. 14, 1977 [JP] Japan ................................ 52/26957

[51] Int. Cl.² ............................ C08F 8/32; C08F 8/34
[52] U.S. Cl. ....................................... 260/4 R; 526/17;
526/30; 526/49; 526/52.2; 526/52.4; 526/52.5;
260/836; 260/888; 526/34; 526/33
[58] Field of Search .................. 526/17, 49; 260/78 A

[56] References Cited

U.S. PATENT DOCUMENTS

| | | | |
|---|---|---|---|
| 4,018,749 | 4/1977 | Onizawa | 260/78 A |
| 4,018,750 | 4/1977 | Onizawa | 260/78 A |
| 4,067,859 | 1/1978 | Onizawa | 260/78 A |

FOREIGN PATENT DOCUMENTS

| | | |
|---|---|---|
| 42-2152 | 1/1967 | Japan. |
| 42-16421 | 9/1967 | Japan. |
| 43-9376 | 4/1968 | Japan. |
| 51-111255 | 12/1976 | Japan. |
| 51-138738 | 11/1976 | Japan. |

OTHER PUBLICATIONS

J.P.S. Part A-1, vol. 9, pp. 639-650 (1971); Modification of PVC, Crosslinking of PVC with Dithiols; Mori et al.

*Primary Examiner*—John Kight, III
*Attorney, Agent, or Firm*—Wenderoth, Lind & Ponack

[57] ABSTRACT

A curable composition comprising a vinyl chloride resin and lysine as a sole curing agent; and a curable composition comprising a vinyl chloride resin, at least one amino acid selected from the group consisting of lysine, ornithine, arginine and proline, and at least one sulfur compound selected from the group consisting of sulfur and sulfur donors, which may further contain rubber.

9 Claims, 4 Drawing Figures

CURABLE VINYL CHLORIDE RESIN COMPOSITION

BACKGROUND OF THE INVENTION

This invention relates to the curing of a vinyl chloride resin.

Vinyl chloride resins are now in widespread use because of their various superior properties. The curing of vinyl chloride resins is very desirable for modifying them or broadening the range of their utility since it brings about a further improvement in some of their properties, such as increased solvent resistance, reduced plastic deformation and increased thermal stability. Accordingly, various suggestions have been made heretofore about the method of curing vinyl chloride resins.

One of such suggestions is a method for curing a vinyl chloride resin by ionizing radiation. Ionizing radiation alone could cure the vinyl chloride resin, but the efficiency of curing is poor and the resin undergoes a marked coloration and a deterioration in properties. It is the usual practice therefore to mix the vinyl chloride resin with a curing promotor and then subjecting the mixture to ionizing radiation. For example, Japanese Patent Publication No. 16421/67 discloses a method which comprises mixing a vinyl chloride resin with a diallyl ester of bicyclo-(2,2,1)-heptane-5-dicarboxylic acid-2,3 and the subjecting the mixture to ionizing radiation to cure the vinyl chloride resin. The method or radiation-induced curing, however, has the defect that an expensive device is required, and a thick shaped article is difficult to produce.

A method is also known to cure a vinyl chloride resin by subjecting it to the action of a peroxide in the presence of a curing promotor. For example, Japanese Patent Publication No. 9376/68 discloses a method for curing a vinyl chloride resin which comprises heating a mixture consisting of the vinyl chloride resin, triallyl isocyanurate and an organic peroxide such as dicumyl peroxide to a temperature above the heat decomposition temperature of the organic peroxide.

It is also known to cure a vinyl chloride resin using a certain compound as a curing agent in the absence of a peroxide. For example, Japanese Patent Publication No. 2152/67 discloses a method which comprises heating a vinyl chloride resin containing hexamethylenediamine as a curing agent; Japanese Laid-Open Patent Publication No. 138738/76, a method which comprises heating a vinyl chloride resin containing hexamethylphosphoryl triamide as a curing agent and a metal oxide such as magnesium oxide as an acid acceptor; and Japanese Laid-Open Patent Publication No. 111255/76, a method which comprises a vinyl chloride resin containing a dithiol-S-triazine derivative as a curing agent and optionally a basic compound as a curing reaction promotor. Journal of Polymer Science, Part A-1, Vol. 9 (1971), pages 639 to 650 discloses the curing of a vinyl chloride resin by treating it with a dithiol compound and ethylenediamine.

The present inventor found that amino acids can be used as vulcanizing agents for some rubbers, and as vulcanization accelerators for other rubbers, and disclosed curable rubber compositions containing the amino acids in U.S. patent application Ser. No. 625,106 filed on Oct. 23, 1977, U.S. patent application Ser. No. 625,874 filed on Oct. 24, 1977, U.S. patent application Ser. No. 653,123 filed on Jan. 28, 1976 which matured into U.S. Pat. No. 4,018,749, U.S. patent application Ser. No. 653,630 filed on Jan. 29, 1976 which matured into U.S. Pat. No. 4,018,750, and U.S. patent application Ser. No. 749,081 filed on Dec. 9, 1976.

The present inventor has now found the new fact that the use of lysine alone can cure vinly chloride resins, and that the use of an amino acid selected from lysine, ornithine, arginine and proline in conjunction with sulfur and/or a sulfur donor can also cure vinyl chloride resins.

SUMMARY OF THE INVENTION

According to the present invention, there are provided a curable composition comprising a vinyl chloride resin and lysine as a sole curing agent, and a cured article obtained by the curing of this composition.

The invention also provides a curable composition comprising a vinyl chloride resin, at least one amino acid selected from the group consisting of lysine, ornithine, arginine and proline, and at least one sulfur compound selected from the group consisting of sulfur and sulfur donors; and a cured article obtained by the curing of this composition.

The invention further provides a curable composition comprising a vinyl chloride resin, rubber, at least one amino acid selected from the group consisting of lysine, ornithine, arginine and proline, and at least one sulfur compound selected from the group consisting of sulfur and sulfur donors; and a cured article obtained by the curing of this composition.

BRIEF DESCRIPTION OF THE ACCOMPANYING DRAWINGS

FIGS. 1, 2, 3 and 4 are torque-time curves described in Examples 1, 2, 3 and 4, respectively.

DETAILED DESCRIPTION OF THE INVENTION

Figure 1:
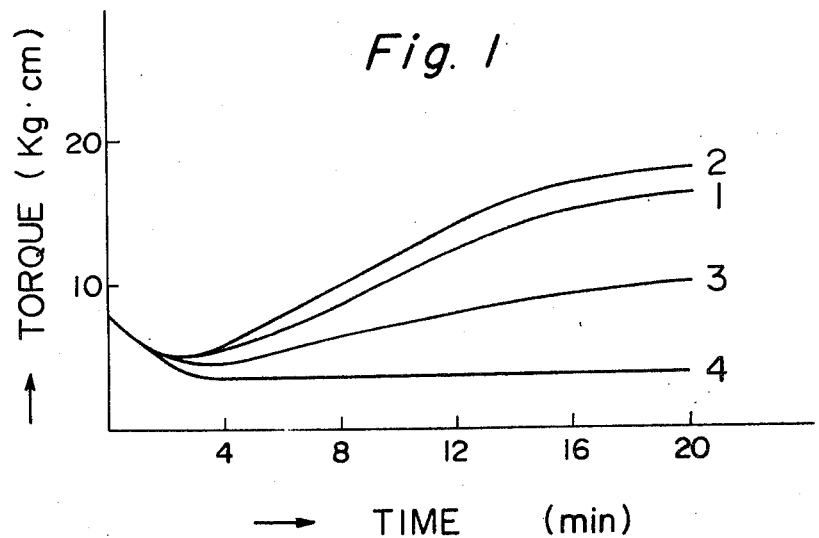

The term "vinyl chloride resin", as used in the present specification and claims, denotes a homopolymer of vinyl chloride, a copolymer of at least 50 mole% of vinyl chloride and a monomer copolymerizable therewith, a mixture of the homopolymer and the copolymer, and a mixture of the homopolymer and/or the copolymer with another polymer in which the vinyl chloride content is at least 50 mole%.

Examples of the monomer copolymerizable with vinyl chloride include vinyl acetate, vinylidene chloride, acrylic or methacrylic acid and esters thereof, maleic acid and esters thereof, acrylonitrile, ethylene, propylene, vinyl caproate, vinyl stearate, and vinyl cetyl ether. Copolymers obtained by copolymerizing (e.g., random copolymerization, graft copolymerization, or block copolymerization) not more than 50 mole%, preferably not more than 20 mole%, of one or more of such monomers with vinyl chloride are the vinyl chloride resins which can be used in this invention. In the present specification and claims, a homopolymer of vinyl chloride and/or a copolymer of vinyl chloride is referred to as a vinyl chloride polymer.

Blended compositions consisting of the homopolymer and/or copolymer of vinyl chloride (the "vinyl chloride polymer") and other polymers, which contain at least 50 mole% of vinyl chloride, are also the vinyl chloride resins that can be used in this invention.

The other polymers to be blended with the vinyl chloride polymer are rubbery or non-rubbery polymers such as an acrylonitrile/butadiene/styrene copolymer, an ethylene/vinyl acetate copolymer, an acrylonitrile/- butadiene copolymer, a styrene/butadiene copolymer, chlorinated polyethylene, a methyl methacrylate/butadiene/styrene copolymer, polyvinyl acetate and polyethylene. That the content of vinyl chloride in the blended composition is at least 50 mole% means that the content of the monomeric vinyl chloride unit in the entire monomeric units constituting the blended composition is at least 50 mole%.

According to a first embodiment of the invention, the present invention provides a curable composition comprising the vinyl chloride resin defined hereinabove and lysine as a sole curing agent. It has been quite unknown heretofore that lysine can be used as a sole curing agent for vinyl chloride resins. Surprisingly, among many amino acids, only lysine is effective as a sole curing agent, and for example, ornithine which has a very similar structure to lysine is not effective as a sole curing agent as shown in Example 1 to be given hereinbelow. Stearoyl lysin obtained by acylating lysine with stearic acid, and its zinc salt are neither effective as a sole curing agent for vinyl chloride resins. The use of lysine as a sole curing agent has the advantage that the operation for curing reaction is simple and lysine is quite nontoxic.

The curing can be effected simply by heating a composition comprising the vinyl chloride resin and lysine at a temperature of 140° to 180° C. The curing reaction may be carried out under pressure, if desired. But the use of elevated pressures is not essential, and curing occurs even at atmospheric pressure. The reaction time varies depending upon the reaction temperature and the amount of lysine added. Usually, the curing reaction begins within a short period of, say, 10 minutes.

The amount of lysine used as a sole curing agent is 0.1 to 50 parts by weight, preferably 0.5 to 20 parts by weight, most preferably 3 to 15 parts by weight, per 100 parts by weight of the vinyl chloride resin.

In accordance with a second embodiment, the present invention provides a curable composition comprising the vinyl chloride resin defined hereinabove, at least one amino acid selected from the group consisting of lysine, ornithine, arginine and proline, and at least one sulfur compound selected from the group consisting of sulfur and sulfur donors. The vinyl chloride resin cannot be cured with sulfur and/or a sulfur donor. The three amino acids mentioned above excepting lysine cannot be used as a sole curing agent for vinyl chloride resins. The use of any of the three amino acids in conjunction with sulfur and/or a sulfur donor can induce the curing of the vinyl chloride resin. Lysine can be used not only as a sole curing agent, but also as a mixed curing agent with sulfur and/or a sulfur donor. It has been quite unknown that a mixture of at least one of the four amino acids specified in this invention with sulfur and/or a sulfur donor can be used as a curing agent for vinyl chloride resins. It is surprising to note that, as shown in Example 2 to be given hereinbelow, the conjoint use of hydroxyproline having a very similar structure to proline and sulfur cannot at all induce the curing of vinyl chloride resins.

The sulfur donor used in the second embodiment of the invention means a substance which becomes active at the temperature of curing and releases sulfur. Such a sulfur donor is known, and includes, for example, sulfur compounds such as sulfur monochloride, sulfur dichloride, morpholine disulfide, alkylphenol disulfides, N,N'-dithio-bis(hexahydro-2H-azepinone-2) and phosphorus-containing polysulfides; thiazole compounds such as 2-(4'-morpholinodithio)benzothiazole; and thiuram polysulfide compounds such as tetramethylthiuram disulfide, tetraethylthiuram disulfide, tetrabutylthiuram disulfide, N,N'-dimethyl-N,N'-diphenylthiuram disulfide, dipentamethylenethiuram disulfide, dipentamethylenethiuram tetrasulfide, dipentamethylenethiuram hexasulfide, dicyclopentamethylenethiuram disulfide and mixed alkylthiuram disulfides.

The amount of the amino acid in the curable composition in accordance with the second embodiment of this invention is 0.1 to 50 parts by weight, preferably 0.5 to 20 parts by weight, per 100 parts by weight of the vinyl chloride resin. The amount of sulfur and/or a sulfur donor is 0.01 to 50 parts by weight, preferably 0.1 to 10 parts by weight, on the same basis.

Curing of the curable composition in accordance with the second embodiment of the invention is performed under the same conditions as in the curing of the curable composition in the first embodiment. The curable composition is simply heated at 140° to 180° C. at atmospheric pressure or, if desired, at an elevated pressure.

In accordance with a third embodiment, the present invention provides a curable composition comprising the vinyl chloride resin defined hereinabove, rubber, at least one amino acid selected from the group consisting of lysine, ornithine, arginine and proline, and at least one sulfur compound selected from the group consisting of sulfur and sulfur donors.

The ingredients of the curable composition other than the rubber are the same as those described with regard to the second embodiment. The rubber used in the third embodiment is known, and includes, for example, acrylonitrile/butadiene rubber (NBR), carboxylated acrylonitrile/butadiene rubber (CNBR), acrylonitrile/isoprene rubber (NIR), acrylonitrile/butadiene/isoprene rubber (NBIR), styrene/butadiene rubber (SBR), polybutadiene rubber (BR), polyisoprene rubber (IR), alfin rubber (AR), epichlorohydrin rubbers including a homopolymer of epichlorohydrin (CHR) and a copolymer of epichlorohydrin with ethylene oxide (CHC) which may be modified with allyl glycidyl ether, propylene/butadiene rubber (PBR), propylene oxide rubber (POR), and natural rubber (NR). The rubbers may be used alone, or as a mixture of two or more in the desired proportions.

It has been the widespread practice to incorporate a minor proportion of rubber in a vinyl chloride resin in order to prevent the heat deformation of the vinyl chloride resin, or its reduction in flexibility at low temperatures. On the other hand, the weatherability and fire retardancy of rubber products have been improved by adding a minor proportion of the vinyl chloride resin to rubber. Products obtained by the former method are used, for example, as hoses and artificial leather products, and those obtained by the latter method, as window frames. A composition consisting substantially of equal amounts of a vinyl chloride resin and rubber is used to produce hoses for conveying gasoline.

According to prior techniques, such blended compositions of vinyl chloride resin and rubber are cured mainly by a combination of sulfur, zinc oxide and a vulcanization accelerator. The cured compositions obtained, however, have various defects because only the rubber is cured and the vinyl chloride resin remains uncured. For example, an increase in heat deformation or a deterioration in properties is observed with an increasing content of the vinyl chloride resin in the compositions. Furthermore, since zinc oxide which is hazardous to man's health becomes extracted, such compositions are unsuitable for use in stoppers for medical-purpose bottles and stoppers for food-containing bottles.

When a composition, in accordance with this invention, consisting of vinyl chloride resin and rubber is cured by at least one amino acid selected from the group consisting of lysine, ornithine, arginine and proline, and a sulfur compound selected from the group consisting of sulfur and/or sulfur donor, both of the vinyl chloride resin and the rubber undergo curing, and the defects described hereinabove are obviated. This brings about the further advantage that as compared with the conventional methods, the rate of curing is fast, and a cured product having good modulus and tensile strength values can be obtained.

In the curable composition according to the third embodiment, the rubber component is contained in an amount of 0.01 to 100 parts by weight, preferably 0.1 to 9 parts by weight, per part by weight of the vinyl chloride polymer component (that is, a homopolymer and/or a copolymer of vinyl chloride). It should be understood that if in the preparation of the curable composition of the third embodiment, a blended composition of the vinyl chloride polymer and rubber is used as the vinyl chloride resin and it is further mixed with rubber, the rubber in the blended composition and the rubber added should both be regarded as the rubber component. The content of the amino acid in the curable composition of the third embodiment is 0.1 to 50 parts by weight, preferably 0.5 to 20 parts by weight, per 100 parts by weight of the vinyl chloride polymer and the rubber combined. The content of sulfur and/or a sulfur donor is 0.01 to 100 parts by weight, preferably 0.5 to 10 parts by weight, per 100 parts by weight of the vinyl chloride polymer and the rubber combined.

Curing of the curable composition of the third embodiment is carried out under the same curing conditions as those employed in curing the curable compositions in accordance with the first and second embodiments. Curing is performed simply by heating at 140° to 180° C. under atmospheric pressure, or if desired, under an elevated pressure.

Any of the curing compositions in accordance with the first to third embodiments of the invention may contain, as required, conventional additives for vinyl chloride resins, such as plasticizers, stabilizers, ultraviolet absorbers, lubricants, fillers, and coloring agents.

These curable compositions and articles obtained by curing them can be used suitably as general rubber products and vinyl chloride resin products such as motor vehicle tires, cable coatings, artificial leathers, sheets, shoe soles, sashes, foamed products, oil seals, shaft seals, tiles, pipes, hoses, printing and spinning rolls, belts, crown cap liners, tubes, battery boxes, roofing sheets, flame retarding materials, colored galvanized plates, and dashboards.

The following examples illustrate the present invention.

The modulus, tensile strength and elongation values shown in these examples were determined in accordance with the method of JIS K-6301 using a Schopper tensile tester at a pulling speed of 500 mm/min. unless otherwise specified.

The hardness values were determined in accordance with JIS K-6301 using a JIS-A type hardness tester.

The torque-time curves were prepared by using a JSR-type Curelastometer.

All parts in these examples are by weight.

EXAMPLE 1

This examples shows that lysine along can cure a vinyl chloride resin, but other amino acids, when used alone, cannot cure it.

A composition consisting of 100 parts of a vinyl chloride resin consisting substantially of a vinyl chloride unit alone (SS-100, a trademark for a product of Denki Kagaku Kogyo Kabushiki Kaisha), 5 parts of tin stearate (stabilizer), 40 parts of di-2-ethylhexyl phthalate (plasticizer) and 10 parts of lysine was masticated for 5 minutes by a 6-inch open roll whose surface temperature was adjusted to 160 ± 5° C. At this stage, no curing occurred.

The composition was removed from the roll, and subjected to a JSR-type Curelastometer whose temperature was adjusted to 165° C. to measure torque variations with time. The torque-time curve obtained is shown at 1 in FIG. 1. From curve 1, it was confirmed that the vinyl chloride resin was cured well by lysine.

The masticated composition was heated for 20 minutes by an electric hot press (pressure 100 kg/cm$^2$) held at 165° C. to obtain a cured vinyl chloride resin sheet. In order to determine its solvent resistance, a piece cut from the sheet was dipped in tetrahydrofuran, it did not dissolve in the solvent.

The above experiment was repeated under the same conditions except that the amount of lysine was changed to 15 and 5 parts, respectively. The torque-time curves obtained are shown at 2 (15 parts) and 3 (5 parts) in FIG. 1. Pieces of cured sheets obtained from these compositions containing lysine in an amount of 15 and 5 parts were dipped in tetrahydrofuran, but did not dissolve in it.

For comparison, the above experiment was performed under the same conditions except that 10 parts of ornithine was used instead of 10 parts of lysine. The torque-time curve obtained is shown at 4 in FIG. 1. It is clear from curve 4 that no curing reaction occurred. A sheet obtained by hot pressing the composition containing ornithine dissolved completely in tetrahydrofuran.

Furthermore, the above experiment was repeated except that 10 parts each of arginine, citrulline, asparagine, glutamine, and cystine was used instead of 10 parts of lysine. In all runs, torque-time curves similar to that obtained in the case of using ornithine resulted, and sheets formed by hot pressing the compositions completely dissolved in tetrahydrofuran.

The same experiment as above was repeated except that 10 parts each of stearoyl lysine and its zinc salt were used instead of 10 parts of lysine. The torque-time curves obtained were quite the same as in the case of using ornithine, and sheets obtained by hot-pressing the compositions completely dissolved in tetrahydrofuran.

EXAMPLE 2

This example shows an experiment in which curing was performed using a mixture of an amino acid and sulfur.

Figure 2:
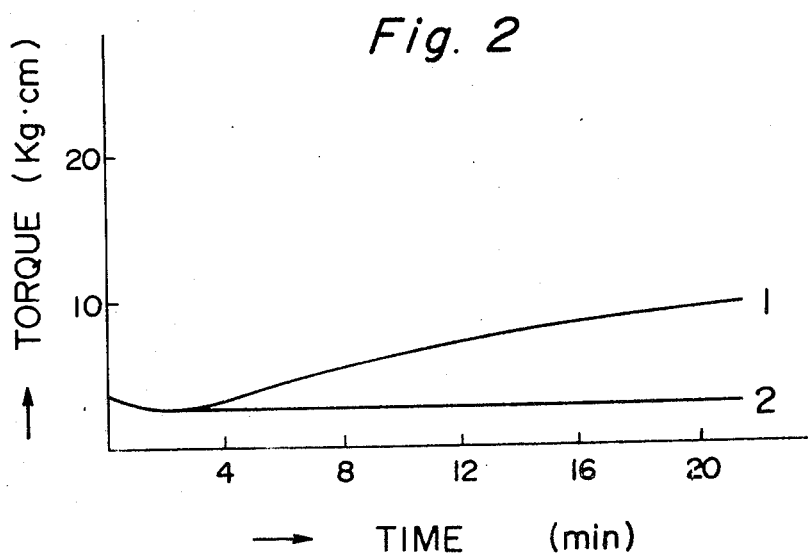

A composition consisting of 100 parts of the same vinyl chloride resin as used in Example 1, 5 parts of barium stearate (stabilizer), 40 parts by weight of di-2-ethylhexyl phthalate (plasticizer), 3 parts of sulfur and 10 parts of proline was masticated for 7 minutes by a 6-inch open roll whose surface temperature was adjusted to 160 ± 5° C. Then, the composition was removed from the roll, and subjected to a JSR-type Curelastometer whose temperature was adjusted to 170° C. to measure torque variations with time. The torque-time curve obtained is shown at 1 in FIG. 2. From curve 1, it was confirmed that the vinyl chloride resin was well cured with proline and sulfur. The masticated composition was heated for 15 minutes by an electric hot press (150 kg/cm$^2$) whose temperature was adjusted to 170° C. to form a sheet.

The sheet was subjected to a Schopper tensile tester at a pulling speed of 200 mm/min, and was found to have a tensile strength of 172 kg/cm$^2$, an elongation of 180%, and a 100% modulus of 139 kg/cm$^2$. Its hardness, measured by a JIS A-type hardness tester, was 88. In order to ascertain its solvent resistance, the cured sheet was dipped in tetrahydrofuran. It did not dissolve in the solvent.

The above experiment was repeated using 10 parts of hydroxyproline instead of 10 parts of proline. The torque-time curve obtained is shown at 2 of FIG. 2. It is clear from curve 2 that no curing reaction occurred. A sheet formed by hot pressing the composition containing hydroxyproline completely dissolved in tetrahydrofuran.

The above experiment was repeated using 10 parts each of tyrosine, serine, alanine, valine, methionine, asparagine and threonine instead of 10 parts of proline. In all runs, quite the same torque-time curves as in the case of hydroxyproline were obtained, and no curing reaction was observed. Sheets formed by hot pressing the compositions containing these amino acids completely dissolved in tetrahydrofuran.

EXAMPLE 3

This example also shows experiments in which a mixture of an amino acid and sulfur was used as a curing agent.

A composition consisting of 100 parts of the same vinyl chloride resin as used in Example 1, 5 parts by weight of tin stearate (stabilizer), 10 parts by weight of di-2-ethylhexyl phthalate (plasticizer), 11 parts of ornithine and 3 parts of sulfur was prepared in the same way as in Example 2. The torque-time curve at 170° C. of the composition is shown at 1 in FIG. 3.

Figure 3:
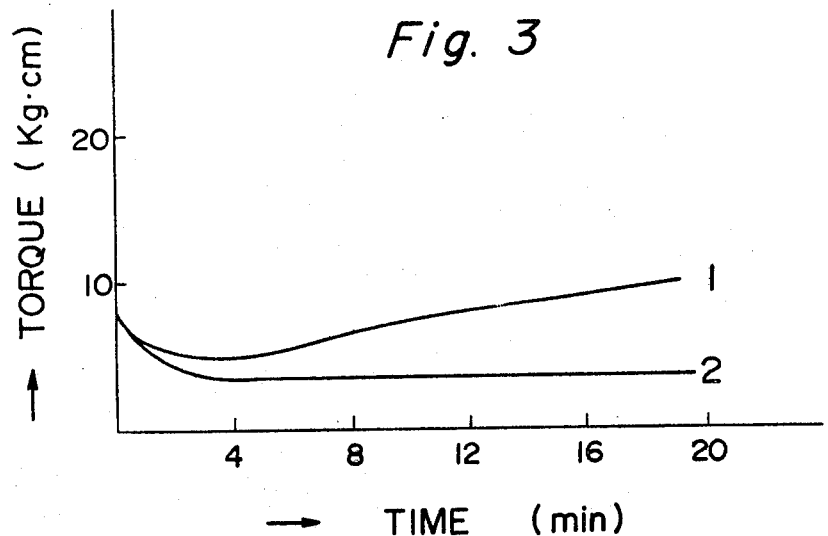

For comparison, a composition having the same formulation as above excepting 3 parts of sulfur was prepared, and its torque-time curve at 170° C. is shown at 2 in FIG. 3.

The experimental results shown in curves 1 and 2 of FIG. 3 demonstrate that the vinyl chloride resin cannot be cured with ornithine alone, but can be cured with a mixture of ornithine and sulfur.

EXAMPLE 4

This and subsequent examples show experiments in which a mixture of a vinyl chloride resin and rubber was cured by a mixture of a specified amino acid and sulfur and/or a sulfur donor.

Figure 4:
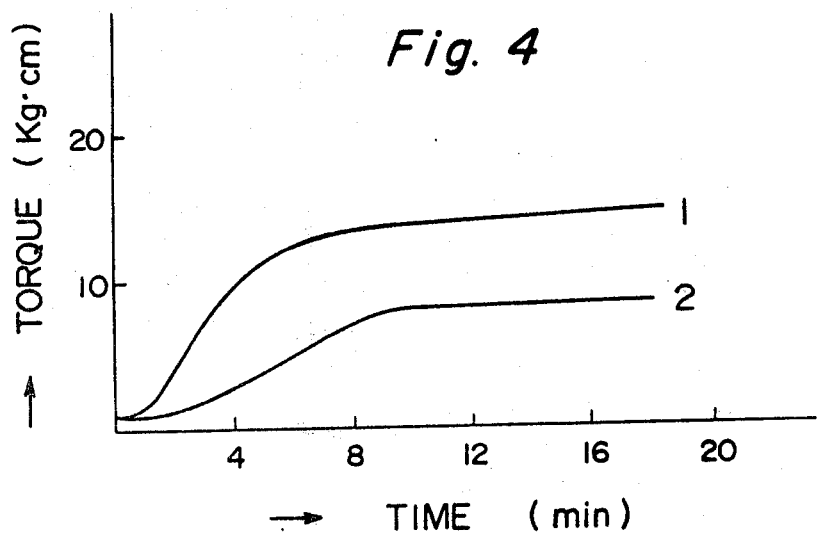

A composition consisting of 100 parts of a blend (available under the registered trademark NIPOL 1203 JN from Nippon Zeon Co., Ltd.) of 70% by weight of an acrylonitrile/butadiene rubber and 30% by weight of polyvinyl chloride consisting substantially of vinyl chloride alone, 40 parts of the same vinyl chloride resin as used in Example 1, 40 parts of di-2-ethylhexyl phthalate and 10 parts of lysine was masticated for 7 minutes by a 6-inch open roll whose surface temperature was adjusted to 160 ± 5° C. Then, 2.5 parts of sulfur was added to the mixture and the mixture was masticated by an 8-inch open roll whose surface temperature was adjusted to 60° C. ± 5° C. in a customary manner to form a composition. The torque-time curve at 165° C. of the masticated composition is shown at 1 in FIG. 4. It is seen from curve 1 that the blended composition of an acrylonitrile/butadiene rubber and a vinyl chloride resin can be well cured with lysine and sulfur.

The masticated composition was heated for 10 minutes by an electric hot press (150 kg/cm$^2$) whose temperature was maintained at 165° C. to cure it. The properties of the cured product were measured by a Schopper tensile tester. The results are shown in Table 1.

For comparison, the same blended mixture of rubber and vinyl chloride resin as above was cured with sulfur alone. The operation was as follows: Mastication on a 6-inch open roll was carried out under the same conditions as above except that lysine was not added. Using an 8-inch open roll whose temperature was adjusted to 60 ± 5° C., 2.5 parts of sulfur, 5 parts of zinc oxide (activator), 1 part of stearic acid (activator) and 1.5 parts of mercaptobenzothiazole (accelerator) were added to the mixture, and a composition was prepared by a customary method of rubber compounding. The torque-time curve of the resulting composition was measured under the same conditions as above, and is shown at 2 of FIG. 4. The composition was cured by using an electric hot press, and the properties of the cured product were measured, and are shown in Table 1 below.

Table 1

|  | Example 4 | Comparison |
|---|---|---|
| Tensile strength (kg/cm$^2$) | 148 | 103 |
| Elongation (%) | 510 | 623 |
| Hardness | 68 | 60 |
| 200% Modulus (kg/cm$^2$) | 56 | 38 |

It is seen from Table 1 that a mixture of acrylonitrile/butadiene rubber and vinyl chloride resin can be cured with a mixture of lysine and sulfur to impart good properties to cured products, and the tensile strength and modulus can be greatly improved over those obtained by the conventional method in which curing was performed by a combination of sulfur, stearic acid, zinc oxide and a curing accelerator. It is also seen from FIG. 4 that in the cure curve obtained with the conjoint use of sulfur and lysine, the rise in torque is great, and the cure curve is far better than that obtained by the conventional method.

EXAMPLE 5

In this example, a composition obtained by adding another rubber to the same mixture (NIPOL 1203 JN, a registered trademark) of acrylonitrile/butadiene rubber and vinyl chloride resin was heated for 30 minutes at 170° C. by an electric hot press using a mixture of an amino acid and sulfur as a curing agent. The compounding recipes of the compositions, and the results obtained are shown in Table 2. The figures used in the compounding recipes represent parts by weight.

Table 2

| Compounding recipe | Run No. | | |
|---|---|---|---|
|  | 1 | 2 | 3 |
| Mixture of 70% by weight of acrylonitrile/butadiene rubber and 30% by weight of polyvinyl chloride (*1) | 50 | 50 | 70 |
| Epichlorohydrin rubber (*2) | 50 | — | — |

Table 2-continued

| Compounding recipe | Run No. 1 | 2 | 3 |
|---|---|---|---|
| Propylene oxide rubber (*3) | — | 50 | 30 |
| SRF-L carbon black (*4) | 20 | 40 | 40 |
| TE-58A (*5) | 1 | 1 | 1 |
| Sulfur | 2 | 2 | 2 |
| Lysine | 2 | 1 | — |
| Ornithine | — | — | 1 |
| 300% Modulus (kg/cm$^2$) | 136 | — | — |
| 200% Modulus (kg/cm$^2$) | — | 51 | 71 |
| Tensile strength (kg/cm$^2$) | 140 | 62 | 85 |
| Elongation (%) | 310 | 270 | 280 |
| Hardness | 74 | 654 | 70 |

Note
(*1): a blended composition sold under the registered trademark NIPOL 1203 JN by Nippon Zeon Co., Ltd.
(*2): an epichlorohydrin rubber sold under the registered trademark Zecron 1100 by Nippon Zeon Co., Ltd. (which is a copolymer of epichlorohydrin and allyl glycidyl ether).
(*3): a propylene oxide rubber sold under the registered trademark Parel 58 by Hercules Company.
(*4): a semi-reinforcing furnace low structure carbon black added as a reinforcing agent.
(*5): an alkali metal salt of a higher fatty acid made by Technical Processing Company, added as a roll operation improver.

EXAMPLE 6

This example shows experiments in which various blended compositions composed of various rubbers and a vinyl chloride resin were cured with mixtures of amino acids and sulfur and/or a sulfur donor.

The compounding recipes of the compositions, and the results obtained are shown in Table 3. The figures showing the proportions of the ingredients in the compounding recipes represent parts by weight. All the compositions were cured by heating at 170° C. for 15 minutes by an electric hot press.

Table 3

| Compounding recipe | Run No. | 1 | 2 | 3 | 4 | 5 | 6 | 7 | 8 | 9 | 10 |
|---|---|---|---|---|---|---|---|---|---|---|---|
| Rubber | Type | Carboxylated acrylonitrile/butadiene rubber (*6) | | | Styrene/butadiene rubber (*7) | | Acrylonitrile/isoprene rubber (*9) | | Acrylonitrile/butadiene rubber (*9) | | |
| | Amount (parts by weight) | 90 | 85 | 50 | 95 | 90 | 75 | 50 | 90 | 80 | 60 |
| Polyvinyl chloride (*1) | | 10 | 15 | 50 | 5 | 10 | 25 | 50 | 10 | 20 | 40 |
| SRF-L Carbon black (*2) | | 30 | 30 | 30 | 30 | 30 | 30 | 10 | 30 | 20 | — |
| TE-58A (*3) | | 1 | 1 | 1 | 1 | 1 | 1 | 1 | 1 | 1 | 1 |
| Epoxidized soybean oil (*4) | | 0.76 | 1.15 | 1.92 | 0.38 | 0.76 | 1.92 | 4 | 0.76 | 1.54 | 3.1 |
| Sulfur | | 2 | 2 | 2 | 0.5 | 1 | 2 | 2 | 2 | 1 | 2 |
| Sulfur donor (*5) | | — | — | — | 2 | — | — | — | — | 1 | — |
| Amino acid | Lysine | 3 | — | — | 2 | 2 | 3 | 3 | — | — | 1 |
| | Proline | — | 3 | — | — | — | — | — | 7 | — | — |
| | Ornithine | — | — | 3 | — | — | — | — | — | 1 | — |
| | Arginine | — | — | — | — | — | — | — | — | — | 2 |
| 300% Modulus (kg/cm$^2$) | | 196 | 172 | 182 | 30 | 34 | 126 | 209 | 112 | 101 | 134 |
| 200% Modulus (kg/cm$^2$) | | — | — | — | — | — | — | — | — | — | — |
| Tensile strength (kg/cm$^2$) | | 244 | 194 | 195 | 158 | 140 | 161 | 254 | 163 | 228 | 178 |
| Elongation (%) | | 380 | 340 | 340 | 960 | 880 | 530 | 400 | 400 | 550 | 380 |
| Hardness | | 72 | 70 | 70 | 47 | 52 | 82 | 98 | 63 | 66 | 76 |

| Compounding recipe | Run No. | 12 | 13 | 14 | 15 | 16 | 17 |
|---|---|---|---|---|---|---|---|
| Rubber | Type | Acrylonitrile/butadiene/isoprene rubber (*10) | | Alfin rubber (*11) | Polybutadiene rubber (*12) | Polyisoprene rubber (*13) | Natural rubber (*14) |
| | Amount (parts by weight) | 97.5 | 85 | 35 | 70 | 75 | 75 | 85 |
| Polyvinyl chloride (*1) | | 2.5 | 15 | 65 | 30 | 25 | 25 | 15 |
| SRF-L Carbon black (*2) | | 30 | 30 | — | 30 | 40 | 30 | 40 |
| TE 58A (*3) | | 1 | 1 | 1 | 1 | — | — | — |
| Epoxidized soybean oil (*4) | | — | — | — | — | 1.92 | 1.92 | — |
| Sulfur | | 1.5 | 1.5 | 2 | 1.5 | 2 | 3 | 3 |
| Sulfur donor (*5) | | — | — | — | — | — | — | — |
| Amino acid | Lysine | 1 | — | 5 | 2.5 | 3 | 3 | 2.5 |
| | Proline | — | 1 | — | — | — | — | — |
| | Ornithine | — | — | — | — | — | — | — |
| | Arginine | — | — | — | — | — | — | — |
| 300% Modulus (kg/cm$^2$) | | 84 | 86 | — | 80 | 90 | 53 | 33 |
| 200% Modulus (kg/cm$^2$) | | — | — | 189 | — | — | — | — |
| Tensile strength (kg/cm$^2$) | | 170 | 208 | 218 | 102 | 100 | 113 | 107 |
| Elongation (%) | | 480 | 560 | 240 | 510 | 360 | 540 | 580 |

| Hardness | 58 | 64 | 91 | 64 | 62 | 55 | 56 |
|---|---|---|---|---|---|---|---|

Note
(*1): polyvinyl chloride composed substantially of vinyl chloride alone, which is sold under the registered trademark PVC 101 EP by Nippon Zeon Co., Ltd.
(*2) and (*3): same as those used in Example 5.
(*4): used as a stabilizer.
(*5): The sulfur donor used in Run No. 4 was tetraethylthiuram disulfide, and the sulfur donor used in Run No. 8 was dipentamethylenethiuram disulfide.
(*6): a carboxylated acrylonitrile/butadiene rubber sold under the registered trademark Nipol 1972 by Nippon Zeon Co., Ltd.
(*7): a styrene/butadiene rubber sold under the registered trademark JSR SBR 1502 by Japan Synthetic Rubber Co., Ltd.
(*8): an acrylonitrile/isoprene rubber sold under the registered trademark Polysar Krynac 833 by Polysar Ltd.
(*9): an acrylonitrile/butadiene rubber sold under the registered trademark Polysar Krynac 3450 by Polysar Ltd.
(*10): an acrylonitrile/butadiene/isoprene rubber sold under the registered trademark Nipol-1201 by Nippon Zeon Co., Ltd.
(*11): an alfin rubber sold under the registered trademark JSR Al 3500 (styrene/butadiene type) by Japan Synthetic Rubber Co., Ltd.
(*12): a polybutadiene rubber sold under the registered trademark JSR BR 01 by Japan Synthetic Rubber Co., Ltd.
(*13): a polyisoprene rubber sold under the registered trademark Kuraprene IR-10 by Kuraray Co., Ltd.
(*14): natural rubber, RSS No. 3.
(*15): in Runs Nos. 3, 7 and 12, the pulling speed of the Schopper tensile tester was 200 mm/min.

What is claimed is:

1. A curable composition comprising a vinyl chloride resin and lysine as a sole curing agent.

2. The composition of claim 1 wherein the amount of lysine is 0.1 to 50 parts by weight per 100 parts by weight of the vinyl chloride resin.

3. A cured article obtained by curing the composition of claim 1.

4. A curable composition comprising a vinyl chloride resin, at least one amino acid selected from the group consisting of lysine, ornithine, arginine and proline, and at least one sulfur compound selected from the group consisting of sulfur and sulfur donors.

5. The composition of claim 4 wherein the amount of the amino acid is 0.1 to 50 parts by weight, and the amount of the sulfur compound is 0.01 to 50 parts by weight, both per 100 parts by weight of the vinyl chloride resin.

6. A cured article obtained by curing the composition of claim 4.

7. A curable composition comprising a vinyl chloride resin, rubber, at least one amino acid selected from the group consisting of lysine, ornithine, arginine and proline, and at least one sulfur compound selected from the group consisting of sulfur and sulfur donors.

8. The composition of claim 7 wherein the amount of the rubber is 0.01 to 100 parts by weight per part by weight of the vinyl chloride polymer in the vinyl chloride resin, and wherein per 100 parts by weight of the vinyl chloride polymer and the rubber combined, the amount of the amino acid is 0.1 to 50 parts by weight, and the amount of the sulfur compound is 0.01 to 100 parts by weight.

9. A cured article obtained by curing the composition of claim 7.

* * * * *